VEHICLES FOR TRAVELLING OVER LAND AND/OR WATER

Filed April 3, 1961

Inventor
C. S. COCKERELL
By Cameron, Kerkam & Sutton
Attorneys

VEHICLES FOR TRAVELLING OVER LAND AND/OR WATER

Filed April 3, 1961 6 Sheets-Sheet 2

Inventor
C. S. COCKERELL
By Cameron, Kerkam & Sutton
Attorneys

May 25, 1965 C. S. COCKERELL 3,185,239

VEHICLES FOR TRAVELLING OVER LAND AND/OR WATER

Filed April 3, 1961 6 Sheets-Sheet 3

Inventor
C. S. COCKERELL
By Cameron, Kerkam & Sutton
Attorneys

VEHICLES FOR TRAVELLING OVER LAND AND/OR WATER

Filed April 3, 1961 6 Sheets-Sheet 4

Inventor
C. S. COCKERELL
By Cameron, Kerkam & Sutton
Attorneys

Inventor
C. S. COCKERELL
By Cameron, Kerkam & Sutton
Attorneys

May 25, 1965 C. S. COCKERELL 3,185,239

VEHICLES FOR TRAVELLING OVER LAND AND/OR WATER

Filed April 3, 1961 6 Sheets-Sheet 6

Inventor
C. S. COCKERELL
By Cameron, Kerkam & Sutton
Attorneys 3,185,239

VEHICLES FOR TRAVELLING OVER LAND AND/OR WATER

Christopher Sydney Cockerell, Lymington, England, assignor to Hovercraft Development Limited, London, England, a British company Filed Apr. 3, 1961, Ser. No. 100,420
Claims priority, application Great Britain, Apr. 8, 1960, 12,688/60; Oct. 18, 1960, 35,626/60
20 Claims. (Cl. 180—7)

This invention relates to vehicles for travelling over a surface, which, in operation, are supported above that surface by at least one cushion of pressurised gas, the cushion being at least partly contained beneath the vehicle by a curtain of fluid issuing from the bottom of vehicle. In particular the invention relates to the means for forming such curtains of fluid.

In vehicles supported by a gaseous cushion or cushions, contained beneath the vehicle by fluid curtains, the mass flow of the fluid for forming the curtains is considerable. Hitherto, in order to keep the size of the fluid pump or pumps and the associated motor or motors within reasonable limits, particularly when the fluid is a gas, centrifugal or axial flow compressors operating at comparatively high speeds have been proposed. The fluid is thus energised at one or more local positions in the vehicle while the port or ports, hereinafter referred to as supply port or ports, through which the fluid is ejected extend around the periphery of the vehicle. Ducting is required to convey the fluid from the pump or pumps to the supply port or ports. The weight and volume of the ducting results in a loss of carrying capacity of the vehicle and there is also a power loss due to the flow of the fluid through the ducting. This power loss is a function, among other things, of duct length and fluid velocity.

With the relatively small vehicle so far employed, the weight and volume of the ducts, and the associated power losses, have formed an appreciable part of the total weight, size and power requirements. In such small vehicles it is difficult to vary the installation of the pump or pumps to an extent which will form a worthwhile improvement. Any installation must, of course, be mechanically sound and preferably easily maintained. The installation in most cases has been a matter of compromise, although in some instances it has provided a very suitable installation for the particular vehicle concerned.

For larger vehicles, very large mass flows of fluid are required and the size and weight of the ducting required still remains an uneconomically large part of the total weight and volume of the vehicle. Furthermore, when fluid curtains of the form in which at least part of the curtain forming fluid is recovered and fed back to the pump or pumps, a further penalty in weight and volume occurs due to the ducting required to convey the recovered fluid to the pump or pumps.

If a plurality of pumps, with or without their associated motors, are positioned at spaced apart locations, particularly at or near the vehicle periphery, the amount of ducting might be reduced, but it would still be necessary to provide considerable amounts of ducting. This is because the fluid would be made available at spaced apart locations at the pump outlets and has to be transferred to the annular supply ports from which the fluid issues to form the curtains. Similarly, the fluid which is recovered has to be collected from the annular recovery port and transferred to the locality of the pump inlet. In addition, these pumps, in order that the size of the pumps should be kept as small as possible, would normally be run at comparatively high speeds and the fluid would then issue from them at a high velocity. This high velocity in itself is a source of high duct losses and also makes it more difficult to diffuse the flow and spread it out evenly along the line of the supply port. Fluid at high velocities cannot be caused to so spread out in short distances without considerable power losses, so that a sufficient length of ducting must be provided between the pump outlet and the supply port in order to obtain the distribution of fluid without undue loss.

Fluid from centrifugal and axial flow pumps issues with a certain degree of "swirl" which also acts to prevent even distribution of the fluid from the spaced apart localities at which the pumps are positioned. Guide vanes can be used, both to reduce swirl and to aid distribution, but these again result in appreciable power losses and add to the weight.

The present invention is based upon the conception that by positioning the pumps at the periphery of the vehicle and arranging the rotary axis of each pump substantially parallel to the surface of the fluid curtain, when formed, in that region of the vehicle, and arranging the flow of fluid from each pump to be in a plane substantially normal to the rotational axis of the pump, some, at least, of the disadvantages associated with the installations described above, can be avoided.

Thus, for example, positive displacement pumps have not been regarded as acceptable due to their large size to produce the necessary mass flow. Further, the ducting would need to be large due to the low fluid velocity from such pumps. However, by selecting a particular form, or particular forms, of positive displacement pumps and by positioning them at the vehicle periphery, the bulk of the pumps can be accommodated more acceptably. Certain further advantages can also be achieved as will be apparent hereinafter.

Again, by installing other forms of pumps, such as centrifugal pumps, in a certain manner, to conform with the conception forming the basis of the invention, these pumps can usefully be employed and some, at least, of the aforesaid disadvantages avoided.

The pump or pumps extend for a substantial portion of that part of the periphery of the gaseous cushion which is contained by the fluid curtain. Such an arrangement provides the possibility of a convenient sub-assembly which can be ready made to be fitted to a vehicle body which has been separately built. It will also enable repairs and maintenance to be carired out on the pump or pumps by providing the facility of ready removal and replacement. Thus spare sub-assemblies can be held available and exchanged for sub-assemblies if it is required to repair or overhaul, without unduly withholding the vehicle from service.

According to the invention, therefore, there is provided, in or for a vehicle supported by one or more gaseous cushions, fluid curtain forming means comprising at least one rotary pump the axis of rotation of which is substantially parallel to the surface of the fluid curtain to be formed. Preferably the flow of fluid from the pump is in a plane normal to the rotational axis thereof.

According to a further feature of the invention there is provided a vehicle for travelling over a surface and which is at least partly supported above that surface by a cushion of pressurised gas, the cushion being contained for at least part of its periphery by a curtain of fluid issuing from the bottom surface of the vehicle, in which the fluid forming the curtain is energized by one or more rotary pumps, the pump or pumps extending for a substantial part of that part of the periphery of the cushion which is contained by the fluid curtain, and the axis of rotation of the pump or pumps being substantially parallel to the surface of the fluid curtain to be formed.

Preferably the delivery of the pump or pumps is in a plane normal to the rotational axis thereof. When at least part of the fluid forming the curtain is recovered and delivered back to the pump or pumps, such delivery is also preferably in a plane normal to the rotational axis of the pump or pumps.

Normally the fluid forming the curtains and the gas forming the cushion is air. A mixture of air and other gases such as exhaust gases can also be used, and when operating over water, the fluid curtains can be of water. However, for convenience, in the following descriptions of curtain embodiments of the invention, the fluid curtains and gaseous cushion, or cushions, will be considered as being formed of air.

The invention will be readily understood by the following description of various embodiments of the invention in conjunction with accompanying drawings in which.

Figure 4:
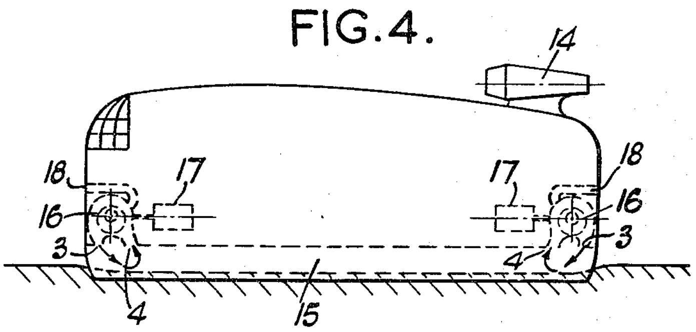
Figure 5:
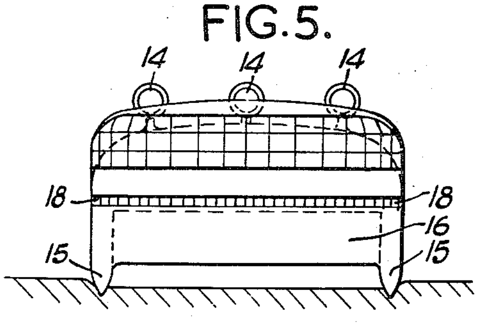
Figure 6:
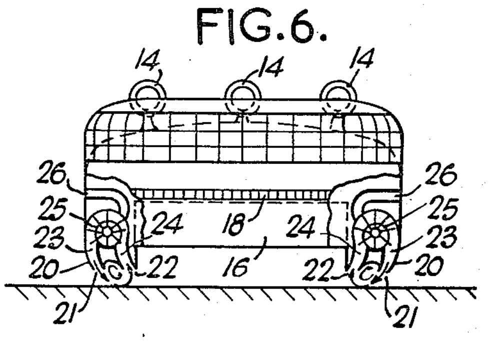
Figures 7, 8:
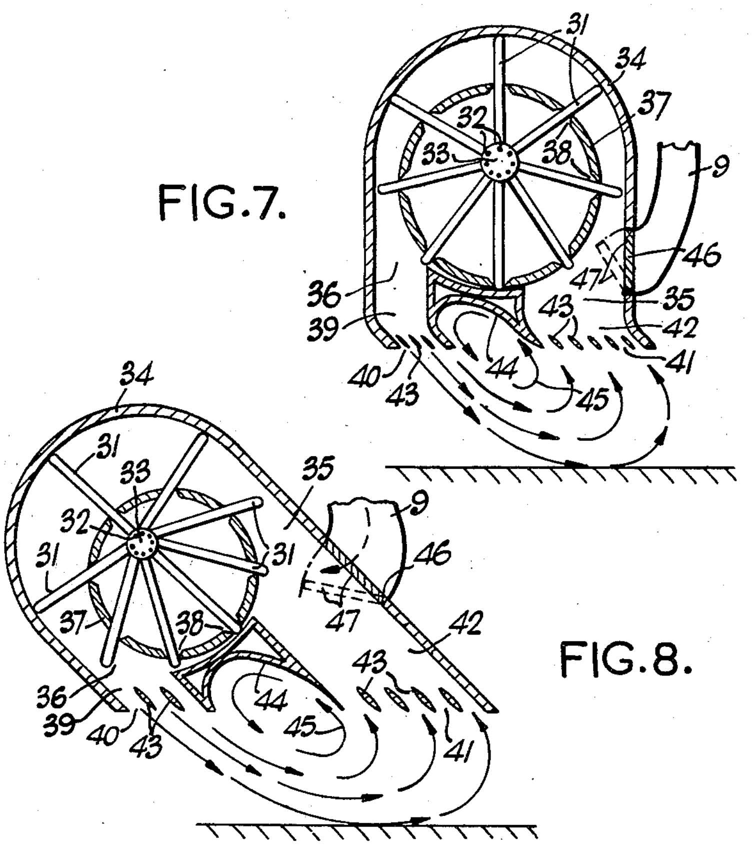
Figure 12:
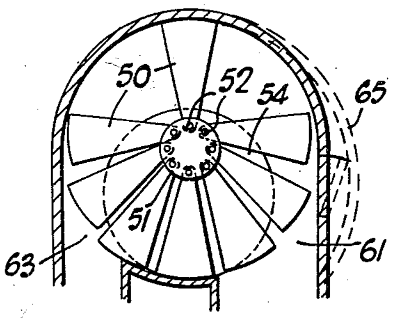
Figure 13:
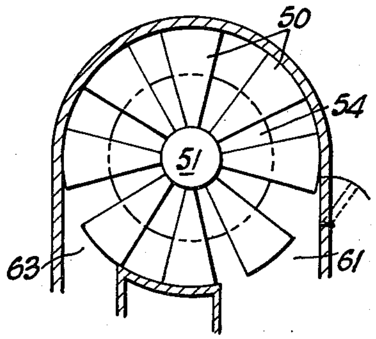
Figures 9, 10, 11, 14, 15:
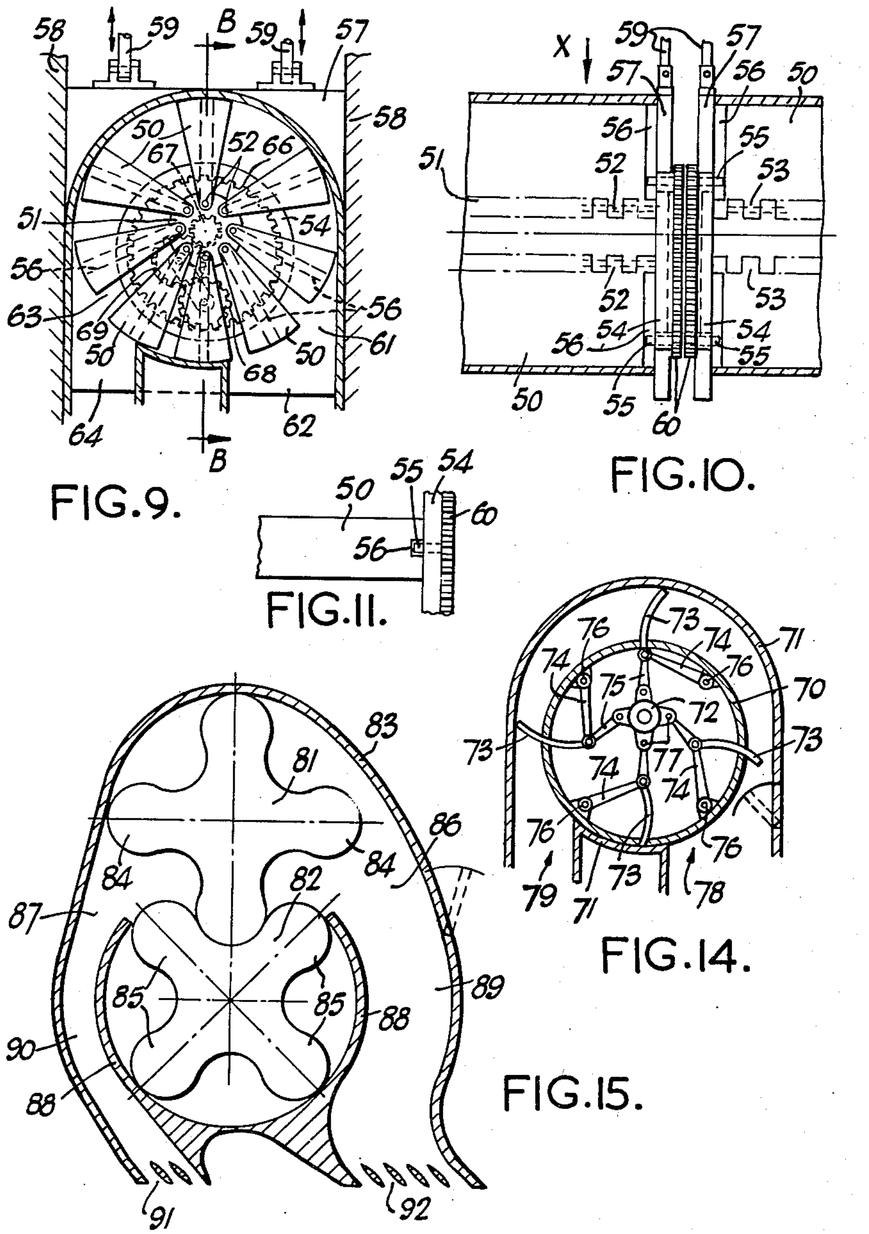
Figure 16:
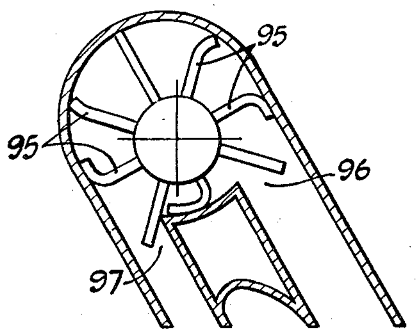
Figure 17:
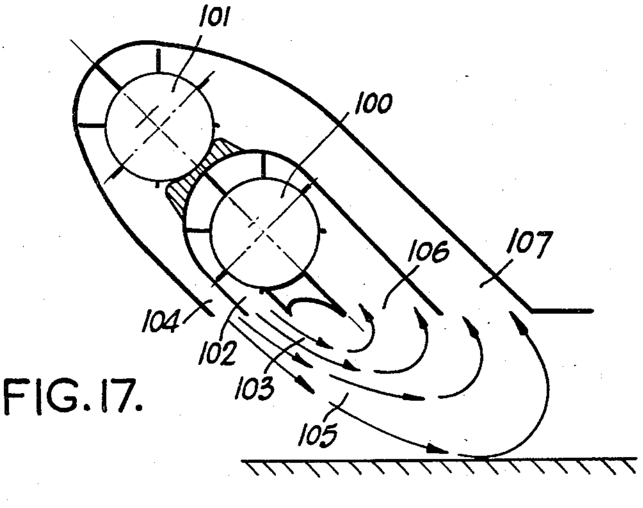
Figure 18:
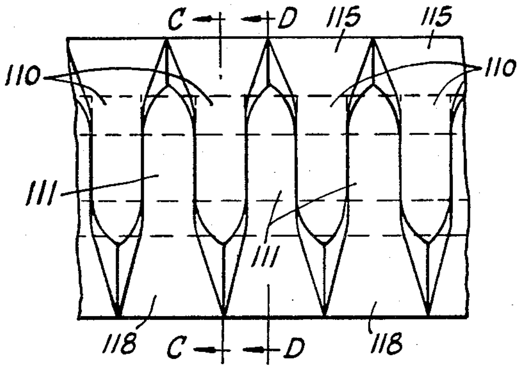
Figure 19:
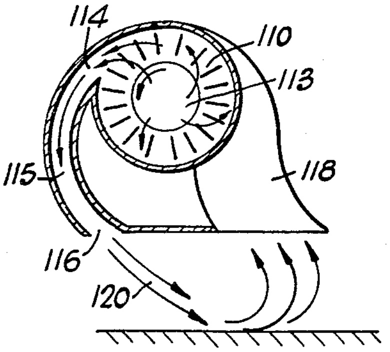
Figure 20:
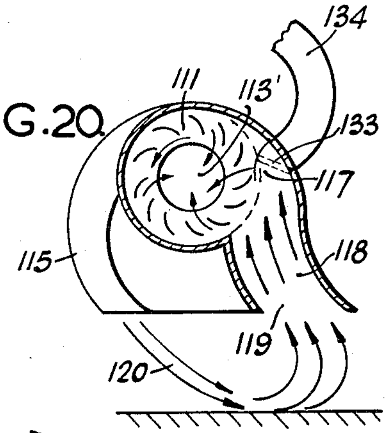
Figure 21:
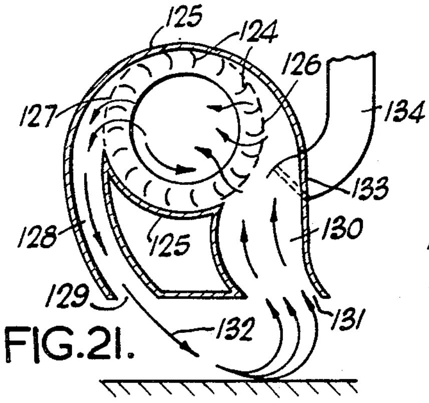
Figure 22:
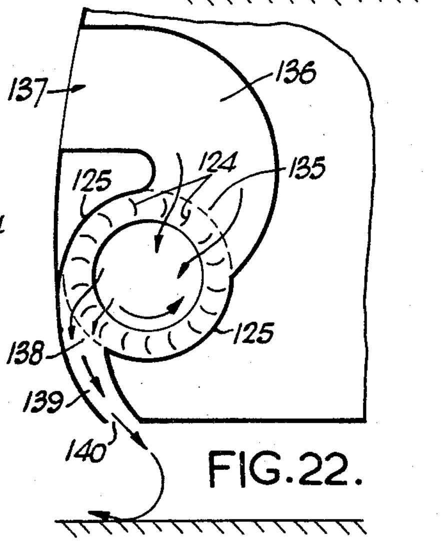

FIGURE 4 is a side elevation of a further form of vehicle embodying the invention, FIGURE 5 is a front elevation of the vehicle illustrated in FIGURE 4, FIGURE 6 is a front elevation of a modified form of the vehicle illustrated in FIGURE 5, the side portions being in section to show the pump installation, FIGURES 7 and 8 are vertical cross-sections on a plane normal to the rotational axis of a vane-type positive displacement pump showing two forms of installation, FIGURE 9 is a vertical cross-section, similar to FIGURES 7 and 8, of a further form of vane-type positive displacement pump, FIGURE 10 is a cross-section on the line B—B of FIGURE 9, FIGURE 11 is a fragmentary view of the end of one of the vanes in FIGURE 10, in the direction of the arrow X, FIGURES 12 and 13 illustrate two operating conditions of the pump illustrated in FIGURES 9 and 10, FIGURES 14, 15, and 16 are cross-sections similar to FIGURE 7 illustrating further forms of positive displacement pumps, FIGURE 17 is a cross-section similar to FIGURE 7 illustrating the use of two pumps to form a stronger curtain, FIGURE 18 is a fragmentary plan view of an installation of centrifugal and centripetal pumps, FIGURE 19 is a cross-section on the line C—C of FIGURE 18, FIGURE 20 is a cross-section on the line D—D of FIGURE 18, FIGURE 21 is a cross-section similar to FIGURES 19 and 20 illustrating a cross-flow pump, and FIGURE 22 is a cross-section similar to FIGURE 21, illustrating the use of a cross-flow pump for a simple curtain system without recovery of any of the curtain fluid.

Figure 1:
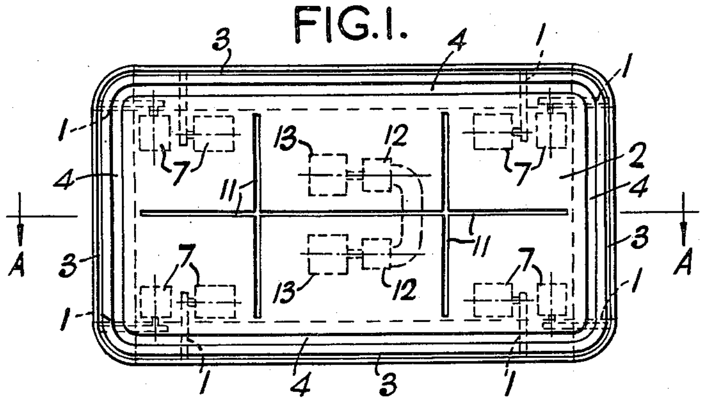
FIGURE 1 is an inverted plan view of a vehicle embodying the invention.
Figure 2:
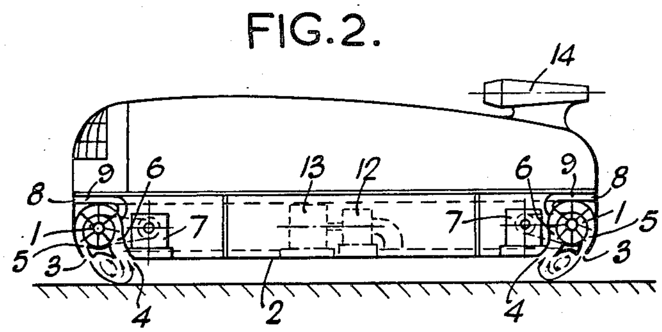
FIGURE 2 is a cross-section on the line A—A of FIGURE 1.
Figure 3:
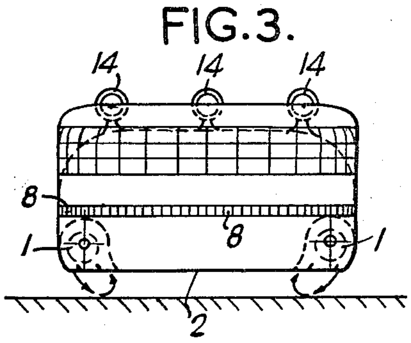
FIGURE 3 is a front elevation of the vehicle illustrated in FIGURE 1.

FIGURES 1, 2 and 3 illustrate a vehicle, generally rectangular in plan form in which the pumps 1 for energising the curtain forming air are situated around the periphery of the vehicle. The pumps are close to the bottom surface 2 of the vehicle. A supply port or nozzle 3 is formed in the bottom surface 2 adjacent to the periphery thereof. A recovery port 4 is also formed in the bottom surface 2, parallel to and slightly inboard of the supply port. The supply port 3 is connected by a short supply duct 5 to the pump outlet and the recovery port 4 is connected by a short recovery duct 6 to the pump intake. In the vehicle illustrated the pump shown is a vane type having radial vanes, being more fully illustrated below with reference to FIGURE 7. The pumps are driven by engines 7.

In operation air is pumped out through the supply port 3 in a downward and inward direction and forms a cushion of pressurised air beneath the vehicle. The cushion of air lifts the vehicle above the surface, the cushion pressure deflecting the air curtain round and upwards, at least part of the curtain forming air flowing into the recovery port 4, and thence back to the pumps. On initial starting, the pumps draw in air from air intake 8 along the front, back and sides of the vehicle via ducts 9. Once the air cushion is formed and is supporting the vehicle the pumps are receiving air from the recovery port but generally not all the curtain forming air is recovered and a certain amount of additional air is still drawn in through the intake 8. The amount of air supplied to the pumps under normal operating conditions can be controlled by flaps or valves, as described below.

Due to the form of the pumps, in a rectangular plan form vehicle, it will be necessary to diffuse or spread out the flow of air from the pumps so as to extend the curtain round the corners of the vehicle. In a vehicle which is of a more rounded plan form, the pumps can be in sections, connected by couplings, extending continuously or substantially continuously right round the periphery.

To improve the stability of the vehicle, the space occupied by the cushion can be subdivided by further air curtains formed by air issuing from further supply ports 11. The air fed to the supply ports 11 may be supplied by any suitable means, such as compressors 12 driven by engines 13. The vehicle can be propelled by any convenient method, gas turbine jet engines 14 being shown in FIGURES 1 to 3.

FIGURES 4 and 5 illustrate a vehicle, having side walls, for operating over water. In the vehicle shown, the side walls 15 are at all times at least partly immersed in the water, the cushion being contained only at the front and rear by air curtains. Pumps 16 extend across the front and rear of the vehicle, the pumps being driven by engines 17. An air intake, such as indicated at 18, is only required across the front and rear of the vehicle for the admission of additional air to the pumps.

FIGURE 6 illustrates a modified form of the vehicle illustrated in FIGURES 4 and 5. In this example, the vehicle has sidewalls 20, but the sidewalls are normally clear of the water. Air curtains are formed beneath the sidewalls, the air issuing from supply ports 21. At least part of the curtain forming air is recovered through recovery ports 22. The sidewalls are comprised mainly of the supply ducts 23 and recovery ducts 24 which connect the pumps 25 with the supply and recovery ports. Depending upon the height of the sidewalls, part or all of the pumps 25 may also be accommodated in the side walls. Additional air for the pumps 25 is taken in through intakes 26 along the sides of the vehicle.

FIGURES 7 to 17 illustrate various forms of positive displacement pumps, by way of example, and various methods of installation. In FIGURE 7, the pump is in the form of a hinged vane type. The vanes 31 are hinged at their inner ends 32 to a central member 33. The vanes, and the central member 33, rotate about an axis passing through the central member, within a cylindrical casing 34. The casing 34 is provided with an intake port 35 and a delivery port 36. Eccentrically mounted within the casing 34 is a rotatable cylindrical member 37, the cylindrical member being mounted so as to leave a clearance at the top and to be almost in contact with the casing at the bottom. The vanes 31 pass through slots 38 cut in the periphery of the cylindrical member 37. As the cylindrical member 37 and the central member 33 are rotated, in unison, the vanes 31 slide in and out through the slots 38, the vanes also pivoting on the hinges. Air is thus pushed round by the vanes over the top of the cylindrical member from the intake port 35 to the delivery port 36. The cylindrical member cooperates with the bottom portion of the cylindrical casing between the intake and outlet ports, to form a seal and prevent any appreciable amount of air flowing back from the delivery port to the intake port. From the delivery port 36 of the pump the air flows through a short duct 39 to a supply port 40 which is formed in the bottom surface of the vehicle. The supply port is arranged so as to eject the air with a direction inwards towards the centre of the vehicle and downwards towards the surface. In the example shown, the air is ejected at an angle of 45° to the horizontal but this can be varied. The air from the supply port 40 flows in the form of a curtain inwards and downwards until it reaches the surface, where it is deflected inwards. The cushion of pressurised air, formed and maintained by the curtain, deflects the curtain of air round and upwards until the air flows into a recovery port 41 formed in the bottom surface of the vehicle substantially parallel to and inboard of the supply port. From the recovery port 41 the air flows through a short duct 42 to the intake port 35 of the pump. Vanes 43 may be provided in the supply and recovery ports to improve the flow of the air through the ports, and to produce the required pressure and velocity values. The bottom surface of the vehicle between the supply and recovery ports may be shaped in a concave form as shown at 44, to promote and accommodate a vortex 45 formed between the curtain and the bottom surface of the vehicle.

As described above, when the vehicle commences operating, there is no cushion formed and the vehicle will be resting on the surface. The flow of air in through the recovery port 41 is thus likely to be restricted or completely prevented. In order to allow a curtain of air to be formed under these conditions an auxiliary inlet 46 is provided, as shown, controlled by a flap or flaps 47. The flap or flaps is or are arranged to open whenever the pressure in the duct 42 leading to the pump intake, falls below a predetermined value. The auxiliary inlet is connected by the duct 9 to the intake 8 as shown diagrammatically in FIGURE 2. The inlet 46 may be positioned at any convenient location in the cylindrical casing or in the duct between the recovery port and the pump intake.

FIGURE 8 illustrates an example which in essence is the same as that shown in FIGURE 7, but which has the axis joining the centres of rotation of the central member 33 and the cylindrical member 37 inclined instead of being vertical as in FIGURE 7. The ducts 39 and 42 connecting the pump delivery port 36 and intake port 35 to the supply port 40 and recovery port 41 respectively, are also inclined so as to be parallel to the inclined axis. The angle of inclination is the same as the desired angle of ejection of the air through the supply port, and recovery through the recovery port, so that no deflection of the air occurs, other than that occurring whilst passing through the pump and that due to the cushion acting on the curtain. No unnecessary deflection of the air therefore occurs and additional power losses which would otherwise occur are avoided.

It will be seen that the eccentricity of the cylindrical member 37 is greater in FIGURE 8 than in FIGURE 7. Increasing the eccentricity both increases the "swept" volume of the clearance between the cylindrical member and the cylindrical casing and the degree of pivoting of the vanes about their hinges. This pivoting causes a further compression of the air as the vanes approach the outlet port. If the vanes are in contact, or nearly so when passing between the outlet port and intake port, then open out as they passed the intake port to a maximum separation and then close together as they approached the outlet port, a large pressure rise would be obtained without a high velocity. Further, if the eccentricity of the cylindrical member is made variable then the volume and pressure of the flow through the pump can be varied from a minimum which is substantially zero when the eccentricity is zero to a maximum when the eccentricity is a maximum.

A pump having the features of variable eccentricity and vanes which produce a high compression with maximum eccentricity is illustrated in FIGURES 9 to 13. In FIGURE 9 which is a cross-section similar to FIGURES 7 and 8, the pump is shown at an intermediate eccentricity. The vanes 50 are of wedge shape cross section on a plane normal to the longitudinal axis of the blades. They are connected at their apices to a central member 51 by pivots formed by rods 52. The construction of the pivots is more clearly seen in FIGURE 10 which is a cross-section on the line B—B of FIGURE 9. The central member 51 has a number of parallel grooves machined round its circumference and the apex of each vane has slots cut across it so that the projecting portions 53 fit into the grooves round the central member. The projections of each vane are retained and positioned in the grooves by metal rods 52 which pass through holes drilled in the rib portions of the central member defining the grooves and in holes drilled through the projections on the vanes. Instead of a cylindrical member rotating the vanes as in the examples shown in FIGURES 7 and 8, a disc 54 is provided at each end, a series of equally spaced pins 55 projecting from the face of the disc adjacent to the ends of the vanes, each pin locating in a radial groove 56 machined in the end of a separate vane. This can be seen more clearly in FIGURES 10 and 11, FIGURE 11 being a view of the top face of a vane in the direction of the arrow X in FIGURE 10. Each disc 54 is supported in a rectangular plate 57 which provides also the means for varying the eccentricity of the disc 54. The rectangular plates 57 are slidably mounted between supports 58 and are moved up and down between these supports by rods 59, the up or down movement decreasing or increasing the eccentricity of the discs 54. The rectangular plates 57 also act as sealing members at the ends of the pumps. The discs 54 are thicker axially than the rectangular plates 57 and project through the plates on the side remote from the vanes. Teeth 60 are machined on the projecting portions of the discs and provide means for driving the discs. It is necessary also to drive the central member 51 and this is done by making the discs 54 recessed on the side adjacent to the vanes and forming an internal gear 66 inside the periphery of each disc. A spur gear 67 is formed on each end of the central member 51 and connected to the respective internal gear 66 by means of two idler gears 68, 69 at each end, the idler gears being mounted so that they move to maintain the connection between the discs 54 and central members 51 as the discs are moved to vary their eccentricity. Air enters the pump via an intake port 61 fed by duct 62 from the recovery port in the bottom surface of the vehicle. The air is expelled from the pump through a delivery port 63, flowing through a duct 64 to the supply port in the bottom surface of the vehicle. FIGURES 12 and 13 show the pump in the maximum eccentricity position and zero eccentricity position respectively. If it is intended to use the pump with the degree of eccentricity shown in FIGURE 12 it would be advisable to modify the intake port by altering the shape of the cylindrical casing adjacent to the intake port, as shown by the dotted lines 65. This will ensure that the spaces between adjacent blades are completely filled with air before access to the intake port is cut off.

Other forms of pumps, in addition to vane type pumps described above, may be used. FIGURE 14 illustrates a pump in which the vanes are part of a hinged link system. A cylindrical member 70 is eccentrically mounted within a cylindrical casing 71. A central member 72 is rotatably supported at the centre of the cylindrical casing. A series of vanes 73 project through slots in the periphery of the cylindrical member and are connected by links 74 and 75 to pivotal connections 76 and 77 on the inside of the cylindrical member and on the outside of the central member respectively. As the cylindrical member is rotated air is forced round from an intake port 78 to a delivery port 79. Apart from the method of mounting the vanes, the operation of the pump is the same as the vane type pumps described above.

FIGURE 15 illustrates a "lobe" type pump. Two cooperating rotors 81 and 82 are rotatably mounted in a casing 83, the rotary axes of the rotors being in a vertical plane. Each rotor has a number of longitudinal lobes 84 and 85, four in the example illustrated, and the rotors are so positioned that the lobes intermesh as the rotors rotate. The lobes 84 of the top rotor 81 are in contact with, or have only a very small clearance from, the top of the casing 83 between intake port 86 and delivery port 87. The bottom rotor 82 rotates within an inner casing 88 which surrounds the rotor for approximately three-quarters of its circumference, only the top quarter being open. The top edges of the inner casing form the lower limits of the intake and delivery ports 86 and 87. Air is fed to the intake port 86 via a duct 89 and air expelled from the delivery port 87 flows into a duct 90. In the example illustrated, when the vehicle is in operation, the top rotor 81 rotates in an anticlockwise direction and air is carried round in the spaces between the lobes 84, being expelled through the delivery port 87. The air is unable to continue back to the intake port as the lobes 85 of the bottom rotor 82 enter the spaces between the lobes 84. The bottom rotor thus acts as a seal. Air from the delivery port 87 flows down the duct 90 and issues from a supply port 91 to form a curtain. After flowing downwards and inwards in the normal manner and being deflected round and upwards by the cushion of pressurised air, the air forming the curtain flows into a recovery port 92 and via duct 89 back to the intake port 86.

FIGURE 16 illustrates a pump in which no central member is provided. The vanes 95 are of material which is flexible, so that the vanes can deflect as they pass round the lower part of the pump. The vanes must be sufficiently stiff however to force air round from the intake 96 to the delivery 97. This stiffness is aided by any centrifugal effect present due to the rotation of the vanes.

Where a strong curtain is required, as for example, where high cushion pressures are required or large operating heights or a combination of both, then the mass flow of the air forming the curtain is correspondingly increaased. This increase in mass flow can be obtained by making the pump or pumps larger in diameter. This increase in diameter can lead to excessive size increases in ducting and other inconveniences. FIGURE 17 illustrates diagrammatically a method of obtaining such increase in mass flow by providing pumps in parallel. In FIGURE 17 two pumps 100 and 101 are provided, the two rotary axes of the pumps being on a plane which is inclined. Air from the lower pump 100 flows to an inner supply port 102 from which it issues to form an inner curtain 103. Air from the upper pump 101 flows to an outer supply port 104 from which it issues to form an outer curtain 105. The curtains of air 103 and 105 are deflected by the cushion pressure and flow upwards into recovery ports 106 and 107 respectively. From the recovery ports the air flows back to the pumps 100 and 101.

The arrangement shown in FIGURE 17 provides a convenient two stage effect in that if a lower cushion pressure is required or the vehicle is required to operate at a lower height only one of the pumps need be operated. When the need for a greater operating height arises, such as when operating over a rougher surface, or when an increased cushion pressure is required to increase the load carrying capacity, then the second pump can be operated.

The examples so far described are of positive displacement pumps, but as stated above, other forms of pumps may be used provided that the installation conforms with the conception forming the basis of the present invention. FIGURES 18 to 22 illustrate two such alternate forms of pump and their installation.

FIGURES 18, 19 and 20 illustrate the use of alternating centrifugal and centripetal pumps, the centrifugal pumps being indicated at 110 and the centripetal pumps at 111. The pumps 110 and 111 have hollow centres 113, and 113', respectively, and are joined together being driven from one or both ends of the series. The hollow centre 113 forms the inlet of the centrifugal pumps 110, which have an outlet 114 at the periphery. A supply duct 115 connects at its upper end to the outlet 114 and has a supply port 116 formed at its other lower end. For the centripetal pumps 111, the hollow centre 113' forms the outlet, while an inlet 117 is formed at its periphery. A recovery duct 118 is connected at its upper end to the inlet 117 and has a recovery port 119 formed at its lower end. The recovery port 119 is parallel to and spaced slightly from the supply port 116.

In operation, air flows from the hollow centre 113 to the outlet 114 of the centrifugal pumps 110 under the action of the rotation of the pump. The air flows down the supply ducts 115 and issues from the supply ports 116 in the form of a curtain, as indicated at 120. The curtain flows downwards and is then deflected round and upwards flowing into the recovery ports 119. From the recovery ports, the air flows through the recovery ducts 118 to the inlets 117 of the centripetal pumps 111. Under the action of the rotation of the pump the air flows inwards to the hollow centre 113'. The air then flows sideways into the hollow centres 113 of the centrifugal pumps 110. The connecting together of the pumps provides a strong rigid tubelike assembly which is capable of readily transmitting the torque required to drive the pumps.

FIGURE 21 illustrates a pump of so-called "cross-flow" type. A series of vanes 124 form the rotor of the pump, the rotor rotating inside a casing 125. The casing is provided with an inlet 126 and an outlet 127. A supply duct 128 is connected at its upper end with the outlet 127 and has a supply port 129 formed at its lower end. A recovery duct 130 is connected at its upper end with the inlet 126 and has a recovery port 131 formed at its lower end. In operation air is caused to flow from the centre of the rotor by the blades 124, the air flowing out of the outlet 127 through the supply duct 128, issuing from the supply port 129 in the form of a curtain as indicated at 132. The air curtain flows downwards and inwards and is then deflected round and upwards, the air flowing into the recovery port 131. From the recovery port the air flows through the recovery duct 130 and in through the inlet 126. From the inlet the air is caused to flow into the centre of the rotor by the blades 124. In both FIGURES 20 and 21 additional air is supplied through an auxiliary inlet 133 via a duct 134.

In all the examples so far described the air curtain has been of the form in which at least part of the curtain forming air is recovered and returned to the pumps. The invention is readily applicable to vehicles having a more simple curtain system in which the air forming the curtain escapes to the surrounding atmosphere. FIGURE 22 illustrates such an arrangement, a cross-flow pump, as shown in FIGURE 21 being taken as an example for the pump. In this example the air inlet 135 to the pump is situated towards the top of the pump and is connected by a duct 136 to an intake 137 formed at the front and/or rear, and, where applicable, the sides, of the vehicle. The air flows through the pump to the outlet 138 and through a supply duct 139 to a supply port 140. The air issues from the supply port in an inwards and downwards direction and is deflected outwards, as shown, by the cushion of pressurised air.

It will be seen that in apparatus according to the invention, the fluid issues from the pump or pumps in a plane which is substantially normal to the rotational axis of the pump or pumps. Thus the fluid may issue in a radial direction, in a tangential direction, or in a direction which is between radial and tangential. The intake to the pump or pumps is also generally of the same form and provides an inlet and outlet fluid flow of convenient form for the supply of fluid for forming the curtains, and, where applicable, for recovering the fluid after it has formed the curtains.

In all cases, the supply port or ports, and the recovery port or ports, may be in the form of continuous ports or in the form of a series of separate ports arranged to produce a continuous air curtain. Where the curtain is formed for only a part of the periphery of the cushion, the port or ports may be continuous or series of separate ports for that part of the periphery.

Arrangements of the ports other than those described and illustrated may be used, such as, for example, are described and illustrated in co-pending application Serial No. 94,736, filed March 10, 1961.

I claim:

1. In a vehicle for travelling over a surface of the type adapted to be at least partly supported above that surface by a cushion of pressurised gas, the cushion being contained for at least part of its periphery by a curtain of fluid issuing from a supply port formed in the bottom surface of the vehicle adjacent to the periphery thereof, the improvement which consists in the provision of a plurality of rotary pumps positioned adjacent to the periphery of the vehicle for energising the curtain forming fluid which issues from the supply port, each of said pumps including an axially elongated rotor extending along a substantial portion of the periphery of the cushion contained by said curtain and having its axis of rotation substantially parallel to the adjacent portion of said curtain.

2. A vehicle as claimed in claim 1 in which each of said pumps includes a fluid outlet so constructed and arranged that the flow of fluid from the pump is in a plane normal to the axis of rotation of the pump rotor.

3. A vehicle as claimed in claim 1 in which each of said pumps includes a fluid outlet so constructed and arranged that the flow of fluid from the pump is substantially radial with respect to the pump rotor.

4. A vehicle as claimed in claim 1 in which each of said pumps includes a fluid outlet so constructed and arranged that the flow of fluid from the pump is substantially tangential to the periphery of the pump rotor.

5. A vehicle as claimed in claim 2 in which each of said pumps includes a fluid intake comprising a recovery port formed in the bottom surface of the vehicle and connected to the pump intake through which port at least part of the curtain forming fluid is recovered into the vehicle and returned to the pump, said pump intake being so constructed and arranged that the flow of fluid into the pump is in a plane substantially normal to the axis of rotation of the pump rotor.

6. A vehicle as claimed in claim 5 in which the direction of flow of fluid through each of the pump outlet and the pump intake is substantially tangential to the periphery of the pump rotor.

7. A vehicle as claimed in claim 1 in which each of said pumps is of a positive displacement type.

8. A vehicle as claimed in claim 7 including means for varying the volumetric displacement of each of said pumps.

9. A vehicle as claimed in claim 1 including a plurality of engines for driving said pumps, said engines also being positioned adjacent to the periphery of the vehicle.

10. A vehicle of the type adapted to be at least partly supported above a surface by a cushion of pressurised gas which is contained for at least part of its periphery by a curtain of fluid issuing from the lower part of the vehicle body, comprising a supply port formed in the bottom surface of the vehicle body adjacent to the periphery thereof, a plurality of rotary pumps for supplying curtain forming fluid to said supply port, said pumps being positioned along the periphery of the vehicle body closely adjacent to the supply port, each of said pumps including an axially elongated rotor extending along a substantial portion of the length of said supply port and having its axis of rotation substantially parallel to the adjacent portion of said supply port, and means for rotating said pump rotors.

11. A vehicle as claimed in claim 10 in which each of said pumps is of a positive displacement type.

12. A vehicle as claimed in claim 11 including means for varying the volumetric displacement of each of said pumps.

13. A vehicle as claimed in claim 10 in which each of said pumps is of a centrifugal type.

14. A vehicle as claimed in claim 10 in which each of said pumps is of a cross-flow type.

15. A vehicle for travelling over a surface of the type adapted to be at least partly supported above that surface by a cushion of pressurised gas which is contained for at least part of its periphery by a curtain of fluid issuing from the lower part of the vehicle body, comprising a supply port formed in the bottom surface of the vehicle body adjacent to the periphery thereof, and a plurality of rotary pump sub-assemblies positioned along the periphery of the vehicle body closely adjacent to the supply port for supplying curtain forming fluid to said supply port, each of said pump sub-assemblies including a pump casing having an inlet and an outlet, an axially elongated pump rotor mounted in said casing with its axis of rotation extending substantially parallel to a portion of the length of said supply port, said pump outlet being so constructed and arranged that the flow of fluid from the pump casing to said supply port is in a plane normal to the rotational axis of the pump rotor, and a relatively short duct connecting said pump outlet to said supply port.

16. A vehicle as claimed in claim 15 including a recovery port formed in the bottom surface of the vehicle body adjacent to the supply port through which at least part of the curtain forming fluid is recovered into the vehicle, and in which each of said pump sub-assemblies includes a relatively short duct for delivering recovered fluid from said recovery port to the pump inlet.

17. A vehicle as claimed in claim 15 including an intake in the vehicle body communicating with the atmosphere, and ducts connecting said intake to the inlets of said pump casings.

18. A vehicle as claimed in claim 15 in which the vehicle body is generally rectangular in plan form and the supply port and the pump sub-assemblies extend around substantially the entire periphery of said body.

19. A vehicle as claimed in claim 15 adapted for operating over water in which the vehicle body includes a pair of downwardly extending side walls normally at least partly immersed in the water, and the supply port and pump sub-assemblies extend only across the front and rear ends of the vehicle body.

20. A vehicle as claimed in claim 15 adapted for operating over water in which the vehicle body includes a pair of downwardly extending side walls normally clear of the water, and the supply port and the pump sub-assemblies extend along the lengths of the side walls.

References Cited by the Examiner

UNITED STATES PATENTS

| | | | |
|---|---|---|---|
| 30,157 | 9/60 | Roots | 230—141 |
| 305,885 | 9/84 | Blackman | 230—157 |
| 509,143 | 11/93 | Smith | 230—124 |
| 918,358 | 4/09 | Noe | 230—125 |
| 974,481 | 11/10 | Gibson et al. | 230—157 X |
| 1,621,625 | 3/27 | Casey. | |
| 1,748,979 | 3/30 | Gunderson | 230—125 |
| 1,787,656 | 1/31 | Anderson | 230—125 |
| 1,907,160 | 5/33 | Schauman. | |
| 2,096,074 | 10/37 | Stevens | 103—129 |

(Other references on following page)

UNITED STATES PATENTS

| | | | |
|---|---|---|---|
| 2,372,480 | 3/45 | Fuchs | 103—136 |
| 2,667,046 | 1/54 | Densham | 230—141 |
| 2,781,729 | 2/57 | Johnson et al. | 103—136 |
| 2,843,049 | 7/58 | Sherwood | 103—117 |
| 2,911,920 | 11/59 | Thompson | 103—117 |
| 3,027,860 | 4/62 | Priest | 180—7 X |

FOREIGN PATENTS

| | | |
|---|---|---|
| 9,011 of 1915 | 3/16 | Great Britain. |
| 1,240,721 | 8/60 | France. |
| 219,133 | 11/58 | Australia. |

A. HARRY LEVY, *Primary Examiner.*

PHILIP ARNOLD, *Examiner.*